United States Patent
Kuo et al.

(10) Patent No.: US 9,332,610 B2
(45) Date of Patent: May 3, 2016

(54) LIGHT FIXTURE CAPABLE OF AUTOMATICALLY CONTROLLING ILLUMINANCE IN AN ACTIVE SMART MANNER

(71) Applicants: Shu Chern Kuo, New Taipei (TW);
Wei-Han Huang, New Taipei (TW)

(72) Inventors: Shu Chern Kuo, New Taipei (TW);
Wei-Han Huang, New Taipei (TW)

(*) Notice: Subject to any disclaimer, the term of this patent is extended or adjusted under 35 U.S.C. 154(b) by 0 days.

(21) Appl. No.: 14/740,423

(22) Filed: Jun. 16, 2015

(65) Prior Publication Data

US 2015/0373808 A1    Dec. 24, 2015

(30) Foreign Application Priority Data

Jun. 20, 2014   (TW) .............................. 103210958 U (51) Int. Cl.
*H05B 33/08* (2006.01)
*F21V 23/04* (2006.01)
*F21V 23/00* (2015.01)
*G01J 1/04* (2006.01)
*G01J 1/02* (2006.01)

(52) U.S. Cl.
CPC .......... *H05B 33/0854* (2013.01); *F21V 23/009* (2013.01); *F21V 23/0464* (2013.01); *G01J 1/0219* (2013.01); *G01J 1/0411* (2013.01); *G01J 1/0422* (2013.01)

(58) Field of Classification Search
CPC ............................ H05B 33/02; H05B 33/0854
USPC .................................................. 315/148–159
See application file for complete search history.

(56) References Cited

U.S. PATENT DOCUMENTS

| 2011/0285310 A1* | 11/2011 | Leinen | H05B 37/04 315/291 |
| 2014/0028199 A1* | 1/2014 | Chemel | H05B 33/0854 315/152 |
| 2015/0145418 A1* | 5/2015 | Pope | H05B 37/0218 315/152 |

* cited by examiner

*Primary Examiner* — Douglas W Owens
*Assistant Examiner* — Jonathan Cooper
(74) *Attorney, Agent, or Firm* — Lin & Associates Intellectual Property, Inc.

(57) ABSTRACT

A light fixture includes a light emitting module for radiating and illuminating a preset illumination area with a fixed illuminance; a light sensor unit mounted on and in electrical communication with the light emitting module, including a light guiding pipe having a first end for guiding reflection light beam from the preset illumination area into the guiding pipe and a light sensor component mounted on a second end of the guiding pipe for measuring an illuminance of the reflection light beam guided into the guiding pipe in order to modulate the light emitting module based on the measured illuminance in such a manner that the light emitting module is capable of actively automatically controlling and maintaining the preset illumination area with the fixed illuminance.

8 Claims, 7 Drawing Sheets

FIG. 7

## LIGHT FIXTURE CAPABLE OF AUTOMATICALLY CONTROLLING ILLUMINANCE IN AN ACTIVE SMART MANNER

CROSS-REFERENCE TO RELATED APPLICATION

This application claims the priority of Taiwanese patent application No. 103210958, filed on Jun. 20, 2014, which is incorporated herewith by reference.

BACKGROUND OF THE INVENTION

1. Field of the Invention

The present invention relates generally to a light fixture, and more particularly to a light fixture, which is capable of automatically controlling to maintain stably an illuminance of incident light on a desired spot/area in an active smart manner, wherein the illuminance is generally shown in "lux" unit, and a measurement of luminus flux over a unit of area.

2. The Prior Arts

A light emitting module, generally called a light source, when electrical power is supplied to thereto and after the electrical power is converted into light power, is capable of radiating a light beam so as to illuminate a targeted spot/area.

The currently available light fixtures, a majority of which possess only one stage or a single function, that is fully illuminating the targeted spot/area when switched on or the targeted spot/area is not illuminated at all when switched off. Such type of light fixture performs only in a single stage and hence results in several problems, the targeted spot/area is too brightly illuminated, and thereby causing undesired waste of electrical power or the targeted spot/area is dimly illuminated. To avoid the problem of too brightly illuminated, one can reduce the number of light bulbs or lamps in the light fixture, such as only employing two light bulbs instead of three and so forth.

Later, some manufacturers have developed light fixtures, which are capable of providing lighting or illumination in multiple stages via externally controlled circuit, like 75%, 50%, 25% of illumination or brightness such that the user can select the required amount of illumination. Another way is the stepless control of illumination, which function can be achieved by manipulating a rotary knob or an electronic controller for automatically selecting the required amount of illumination. A common problem is resulted when the above-mentioned two types of light fixtures are implemented, that is the light fixture is required to be actively manipulated by the user when the external environmental illumination varies, those light fixtures can only provide degree of illumination or dimness according to the currently set illuminance Moreover, the light fixtures are again improved to overcome the existing disadvantages, that is sensor or detection devices are implemented so as to automatically adjust and modulate the illumination of a desired spot/area. In other words, the adjustment is conducted not relative to the light source or the illuminance of the focusing area. Under this condition, the sensor device is unable to automatically and effectively detect and fix the illuminance of the focusing area, thereby leading the wrong determination of the afterward performance, such as automatically increasing and decreasing the illumination or irregular increasing and decreasing the illumination. When such events occur, the viewer has to bear a great visual burden, i. e., vision damage and this can be avoided if the viewer is a youth, or the vision damage is not realized or noticed by the viewer if he is too young to know the defects. Of late, the average vision of majority of citizens is vividly and gradually getting worse day by day.

Therefore, the major object of the inventor of the present application or the manufacturers in the similar field is in an urgent desire to find out how to eliminate the above-mentioned disadvantages.

SUMMARY OF THE INVENTION

A primary objective of the present invention is to provide a light fixture based on former experiences such that the light fixture is capable eliminating the prior art disadvantages mentioned above.

One distinct feature of the present invention resides in that a light emitting unit is driven by a driving unit so as to radiate a light beam while a light emitting module is constituted by a light sensor element, which transmits data to modulate the driving unit in order to control and maintain an illuminance of incident light on a desired spot/area. In the event of variation in the illuminance, the varied illuminance can be detected via a light sensor component mounted on one end of a light guiding pipe which has another end to permit or guide the reflection light beam from an illumination area for focusing on the light sensor component, thereby measuring the varied illuminance which is latter converted by a converter circuit interface to modulate the preset fixed illuminance. The implemented technique is similar to a traditional camera focusing a target and applied in the light fixture of the present invention so that the light fixture of the present invention is capable of automatically controlling and maintaining stably the illuminance of incident light on a desired spot/area in an active smart manner. In other words, since no manually manipulating by the user is required in the light fixture of the present invention, the prior art disadvantages can be avoided.

A light fixture of the present invention accordingly includes a light emitting module for radiating and illuminating a preset illumination area/spot with a fixed illuminance; a light sensor unit mounted on and in electrical communication with the light emitting module, including a light guiding pipe having a first end for guiding reflection light beam from the preset illumination area/spot into the guiding pipe and a light sensor component mounted on a second end of the guiding pipe for measuring an illuminance of the reflection light beam guided into the guiding pipe in order to modulate the light emitting module based on the measured illuminance in such a manner that the light emitting module is capable of actively automatically controlling and maintaining the preset illumination area with the fixed illuminance. The light emitting module further includes a module casing, a driving unit installed in or out of the module casing, a light emitting element disposed in the module casing and electrically connected to the driving unit, and a converter circuit interface disposed in the module casing and connected electrically with the driving unit for controlling the fixed illuminance of the preset illumination area.

Due to the above-mentioned structure, when the light emitting element is activated, the light beam emitted therefrom is focused into the preset illumination spot/area with the fixed illuminance, wherein the reflected light beam from the preset illumination spot/area is reflected into the light guiding pipe directly onto the light sensor component, which measures the intensity and transmits a sensed signal to the converter circuit interface that converts the varied illuminance into varied current to modulate the driving unit. Under this condition, the driving unit outputs an increased or decreased varied voltage to modulate the light emitting beam of the light emitting element, thereby controlling and maintaining the illuminance of the preset illumination spot/area stably in active smart manner.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

Figure 1:
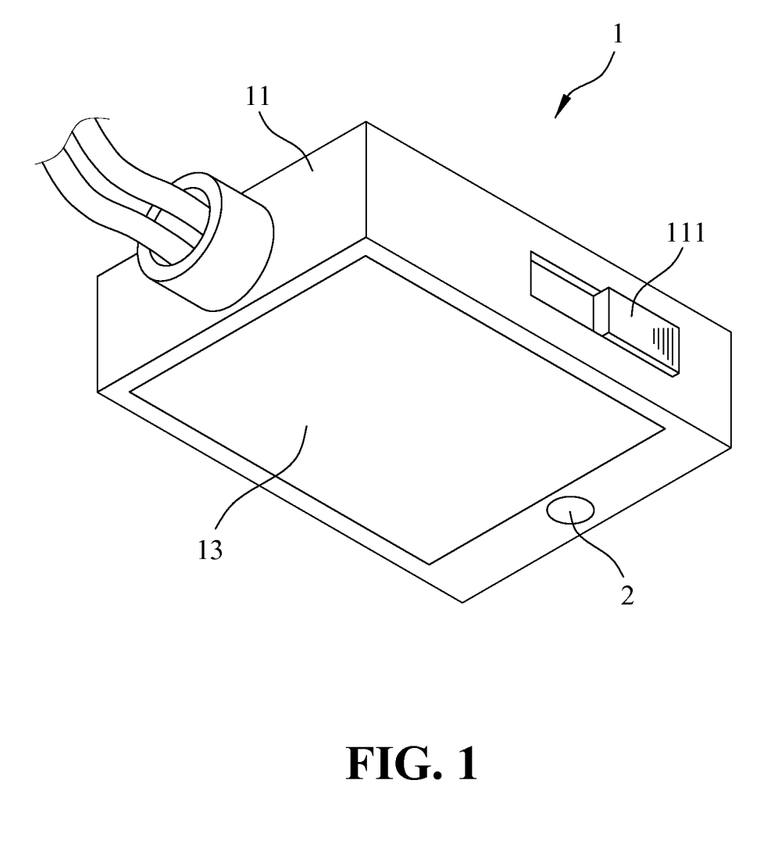
FIG. 1 is a perspective view of a light fixture of the present invention.
Figure 2:
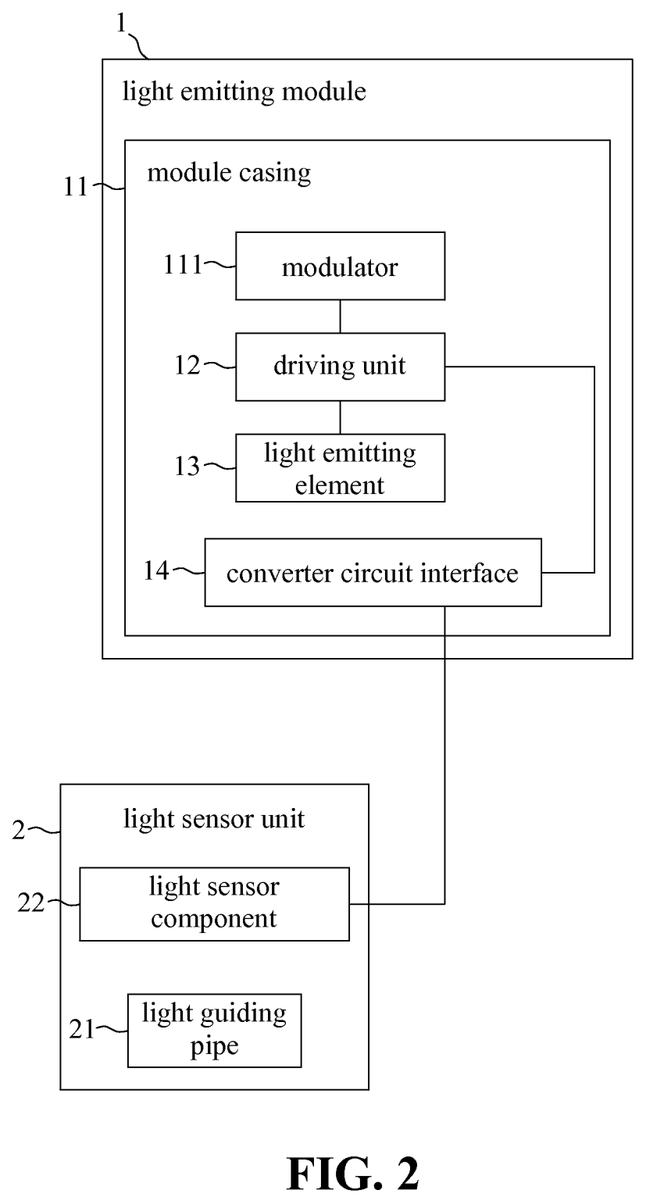
FIG. 2 shows a block diagram illustrating elements constituting the light fixture of the present invention.
Figure 3:
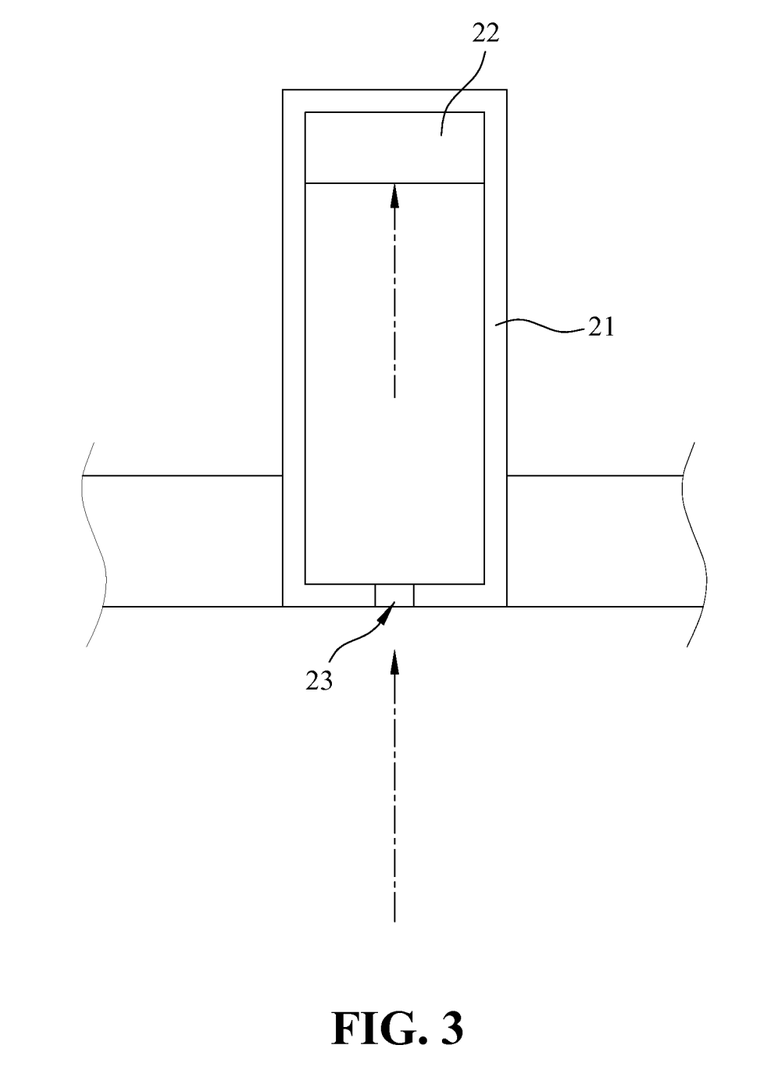
FIG. 3 illustrates how reflected light beam of a targeted spot/area illuminated by the light fixture of the present invention enters into a light sensor unit implemented in the light fixture.

Referring to FIGS. 1-3, wherein FIG. 1 is a perspective view of a light fixture of the present invention; FIG. 2 shows a block diagram illustrating elements constituting the light fixture of the present invention; while FIG. 3 illustrates how reflected light beam of a desired or targeted spot/area illuminated by the light fixture of the present invention enters into a light sensor unit implemented in the light fixture. As shown, the light fixture according to the present invention includes a light emitting module 1 for radiating and illuminating a preset illumination area/spot (such as targeted area/spot) with a fixed illuminance; and a light sensor unit 2 mounted on and in electrical communication with the light emitting module 1, including a light guiding pipe 21 having a first end for guiding reflection light beam from the preset illumination area/spot into the guiding pipe 21 and a light sensor component 22 mounted on a second end of the guiding pipe 21 for measuring an illuminance of the reflection light beam guided into the guiding pipe 21 in order to modulate the light emitting module 1 based on the measured illuminance in such a manner that the light emitting module 1 is capable of actively automatically controlling and maintaining stably the preset illumination area with the fixed illuminance.

In this embodiment, the light emitting module 1 includes a module casing 11, a driving unit 12 installed in the module casing 11, a light emitting element 13 disposed in the module casing 11 and electrically connected to the driving unit 12 and a converter circuit interface 14 disposed in the module casing 11 and connected electrically with the driving unit 12 for controlling the fixed illuminance of the preset illumination area/spot.

Preferably, the light sensor unit 2 and the light emitting element 13 are disposed in a same horizontal plane (see FIG. 3). To be more specific, an LED unit is implemented in the light fixture of the present invention for serving as the light emitting element 13. The light fixture of the present invention further includes a modulator 111 disposed in the module casing 11 and connected electrically with the driving unit 12 for modulating the illuminance of the preset illumination area/spot.

The light guiding pipe 21 is preferably a straight guiding pipe having the first end defining a small opening 23 (see FIG. 3) to permit entering of reflection light beam from a target area/spot and the second end provided with the light sensor component 22.

Figure 4:
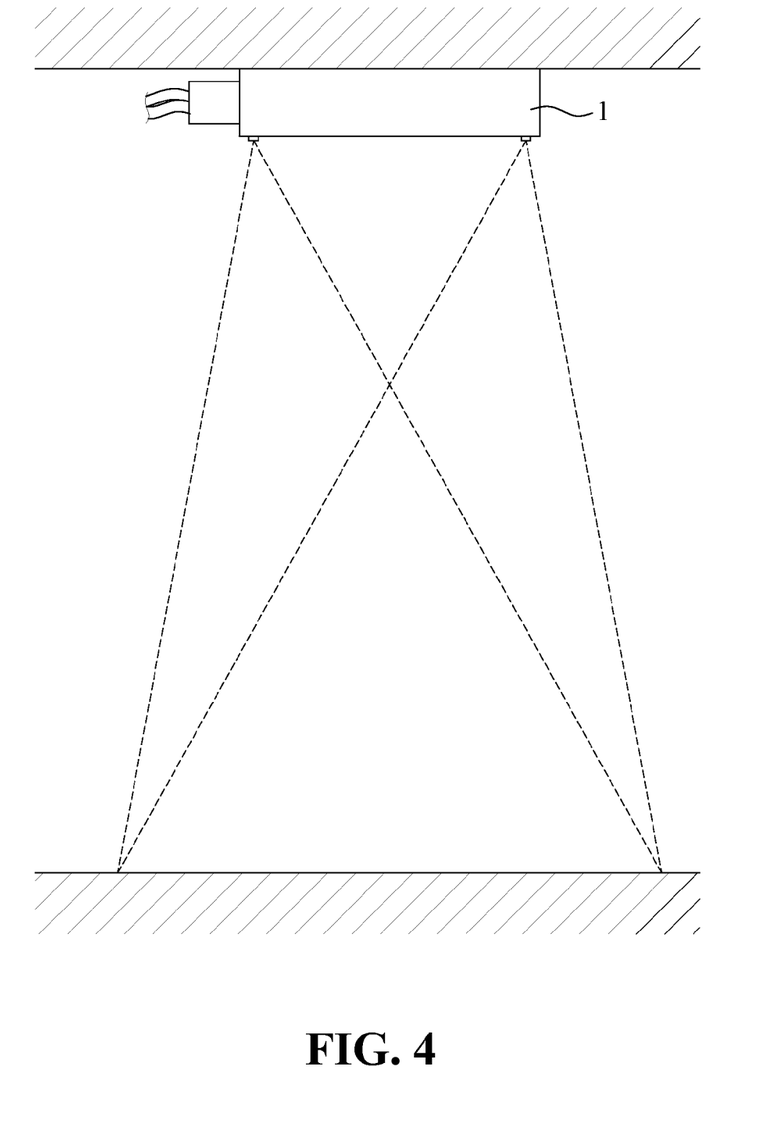
FIG. 4 illustrates how the targeted spot/area is illuminated by the light fixture of the present invention when the light fixture serving as a table lamp while the targeted spot/area is a study desk used by a student studying at the study desk.
Figure 5:
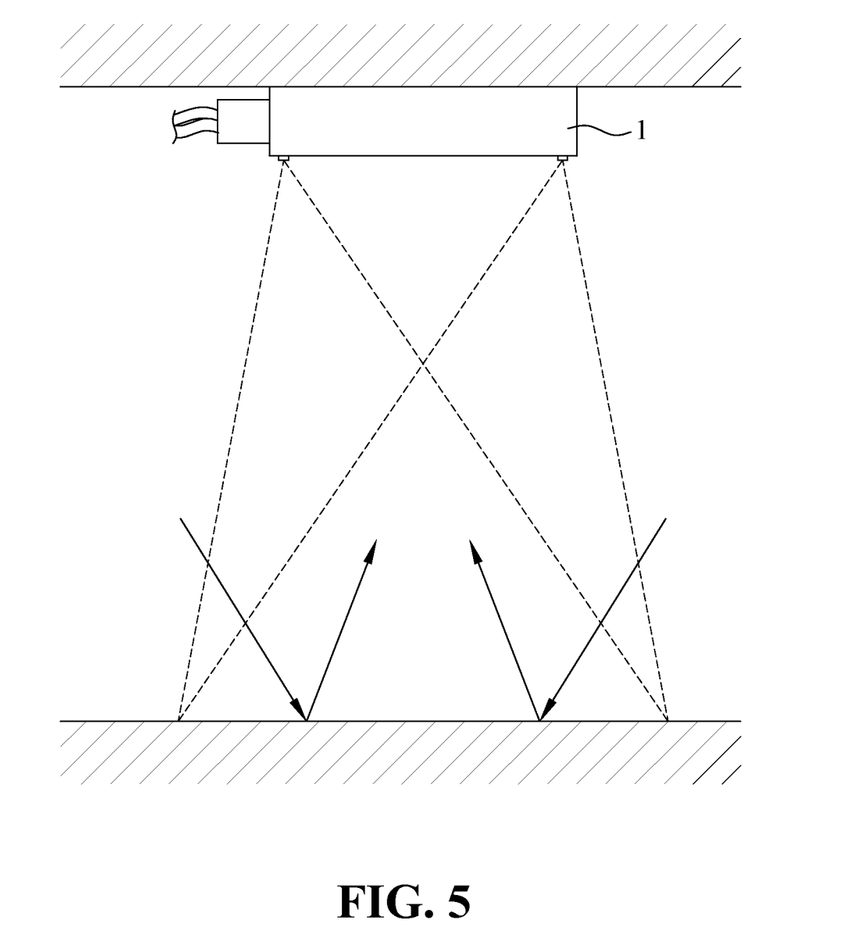
FIG. 5 illustrates a state how the reflected light beam from the targeted spot/area illuminated by the light fixture of the present invention reflects back after hitting the targeted spot/area when the light fixture serving as a table lamp while the targeted spot/area is a study desk used by a student studying at the study desk.

Referring to FIG. 2, in this embodiment, the light emitting module 1 and the light sensor unit 2 are installed along the light emitting direction of the light fixture of the present invention while the light guiding pipe 21 is preferably a straight guiding pipe having the first end defining the small opening 23 to permit entering of ambient light beam (the environment) from the target area/spot into the light guiding pipe 21 (similar to finding the optimum focus in a camera) such that the entered light beam is focused on the light sensor component 22 mounted on the second end of the light guiding pipe 21. The intensity of illumination sensed or measured from the preset illumination area by the light sensor component 22 is converted by the converter circuit interface 14 into a change signal that is transmitted to the driving unit 12 such that the modulator 111 modulates the driving unit 12 to output a varied voltage so as to control the light emission of the light emitting element 13. To be more specific, in the event of change of brightness in the environment, the light sensor unit 2 is capable of detecting the varied illumination of the environment. For instance, a distance between the targeted spot/area to be illuminated and the light emitting element 13 of the light fixture of the present invention is shortened (when the light fixture functions as a table lamp as best shown in FIG. 4), the light sensor component 22 can detect that the entering light beam reflected after hitting the target spot/area (such as a study desk) into the light guiding pipe 21 gets greater in intensity see FIG. 5) such that the converter circuit interface 14 may transmit a change signal (increase the current flow) based on the change relative to the preset illuminance, where the modulator 111 modulates the driving unit 12 based on the change signal, thereby causing the driving unit 12 to output a lower voltage to the light emitting element 13 so as to control the light emitting capacity of the light emitting element 13. In contrast, when a distance between the targeted spot/area to be illuminated and the light emitting element 13 of the light fixture of the present invention is prolonged, the light emitting element 13 will emit the light beam of greater luminous flux in order to reach or illuminate the target spot/area, thereby maintaining the illuminance of the target spot/area stably and uniformly such that the user applying the light fixture of the present invention may not get dizziness or blur visual perception due to high intensive illumination, thereby eliminating the prior art disadvantages resulted from using the traditional light fixtures. An important fact to note is that since the light sensor unit 2 implemented in the light fixture of the present invention is capable of precisely sensing the illumination degree of a targeted spot/area, the following variation and modulation can be conducted precisely (the interactive effects among the light sensor component 22, the converter circuit interface 14, the driving unit 12 and the light emitting element 13).

Figure 6:
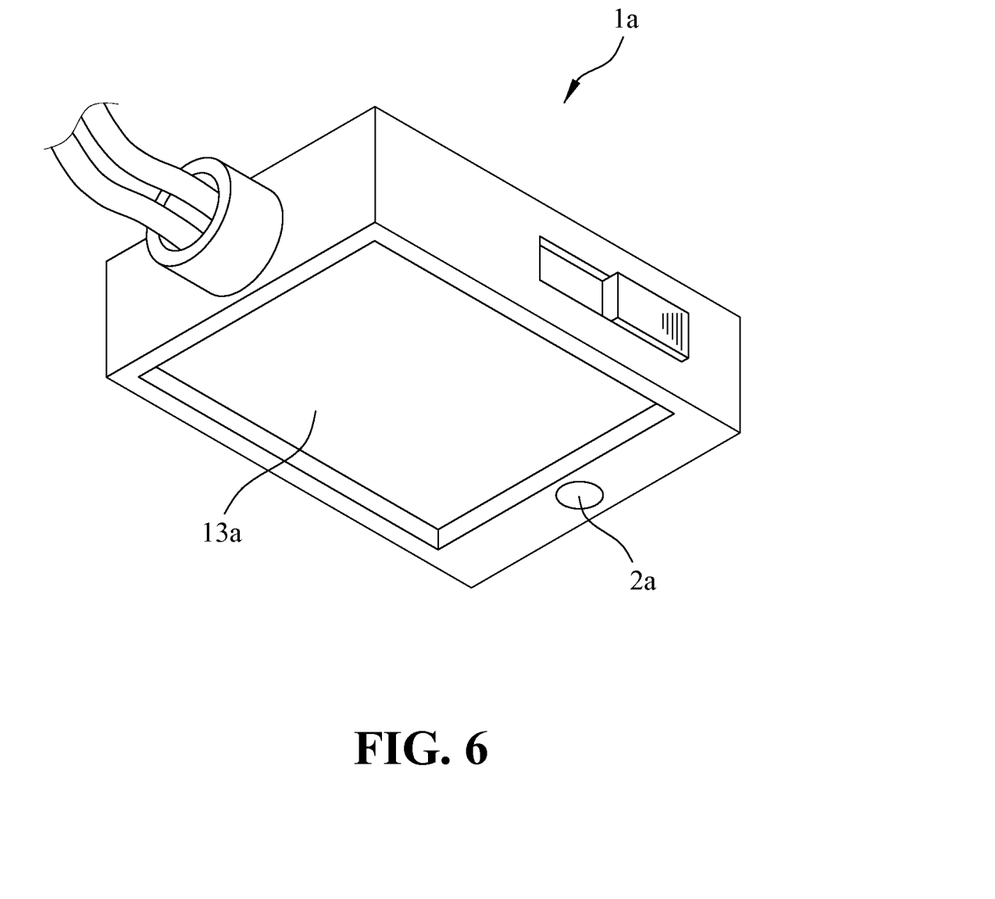
FIG. 6 is a perspective view of a modified light fixture of the present invention.
Figure 7:
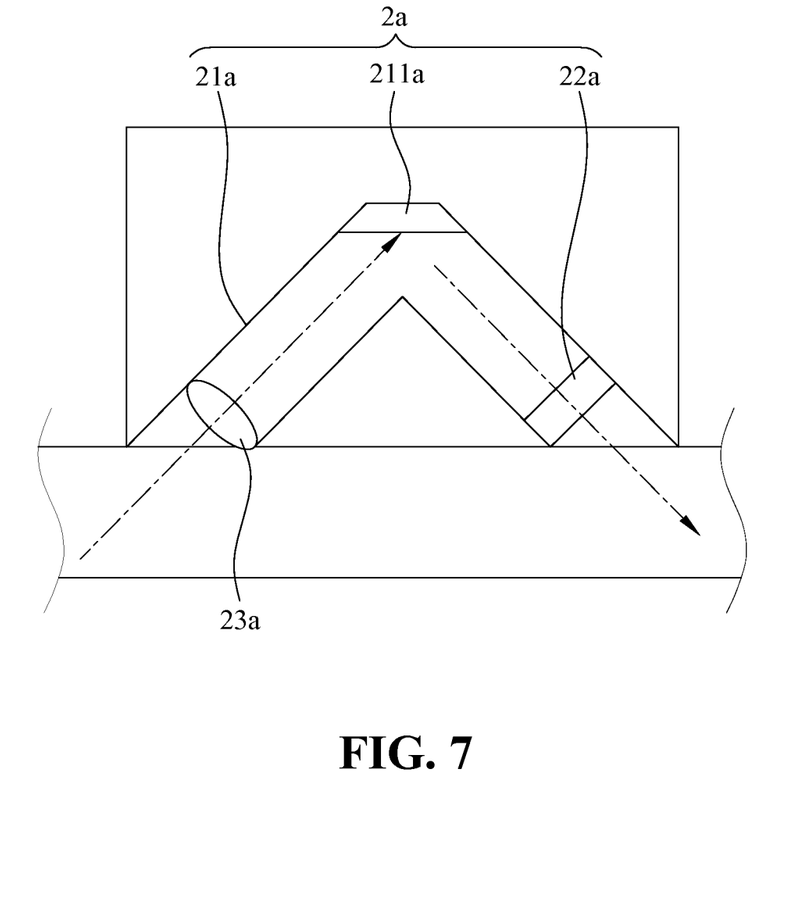
FIG. 7 illustrates how reflected light beam from the targeted spot/area illuminated by the modified light fixture of the present invention enters into a light sensor unit implemented in the modified light fixture.

Referring to FIGS. 6 and 7, wherein FIG. 6 is a perspective view of a modified light fixture of the present invention; and FIG. 7 illustrates how reflected light beam from the targeted spot/area illuminated by the modified light fixture of the present invention enters into a light sensor unit implemented in the modified light fixture. The modified embodiment has the structure similar to the previous ones except that the light sensor unit 2a includes a light guiding pipe of generally U-shaped or V-shaped having a first straight pipe section (21a) with the first end defining an opening and a second straight pipe section provided with the light sensor component 22a such that in case the light guiding pipe (21a) is in V-shaped or U-shaped, an intermediation section 211a of the V-shaped guiding pipe (21a) is installed with a reflector for reflecting light beam entering through the opening 23a, wherein a focusing lens 23a is provided at the opening of the light guiding pipe (21a) for focusing and some scattered light beams into the first straight pipe section (21a) toward the intermediation section (211a) (herein the reflector) so as to finally reflect directly toward the light sensor component (22a), which measures the varied illuminance after focusing. Preferably, a mirror is served as the reflector (211a) of the V-shaped or U-shaped guiding pipe (21a). It is noted that implementation of V-shaped or U-shaped light guiding pipe (21a) can effectively prevent the influence of the environmental illumination entering into the light guiding pipe (21a). Owing to this reason, the light sensor component (22a) can be installed at a front portion of the light emitting module (1a), that is frontwardly of the light emitting direction of the light emitting element (13a) (see FIGS. 3 and 7) in order to prevent the light beam emitted from the light emitting element (13a) from getting into the light sensor component (22a).

The light fixture of the present invention can eliminate the following disadvantages resulted from the use of prior art light fixtures.

(i) Owing to physical property of light and by integrating the assembly of the light guiding pipe 21, the reflection member (211a) and the focusing lens or a relatively small opening in the light guiding pipe, the light sensor component 22 is capable of precisely sensing the illuminance of the targeted spot/area upon which the light fixture of the present invention is illuminated, hence the location position of the light sensor unit 2 is more flexible when compared to prior art light fixture. Integration of the converter circuit interface 14 and the driving unit 12, the light emitting element 13 is capable of emitting the light beam based on the gradually varied brightness, thereby providing and maintaining the illuminance in a stably manner.

The light sensor unit 2 employed in the light fixture of the present invention is capable of automatically sensing and modulating the illuminance of the targeted spot/area (the preset illumination area with a fixed illuminance) by the implementation of the focusing lens or the small opening, the reflection beam from the targeted spot/area can be defined precisely so as to permit the light sensor component 22 to determine (or measure) whether the target spot/area is illuminated with the fixed illuminance or not, this technique is different from the prior art ones.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A light fixture comprising:
a light emitting module for radiating and illuminating a preset illumination area with a fixed illuminance, said light emitting module including a module casing, a driving unit installed in or out of said module casing, a modulator disposed in said module casing and electrically connected to said driving unit for modulating illuminance of said preset illumination area, at least one light emitting element disposed in said module casing and electrically connected to said driving unit, and a converter circuit interface disposed in said module casing and connected electrically with said driving unit; and
a light sensor unit mounted on and in electrical communication with said light emitting module, said light sensor unit including a light guiding pipe having a first end for guiding a reflection light beam from said preset illumination area into the light guiding pipe and a light sensor component mounted on a second end of the light guiding pipe for measuring an illuminance intensity of the reflection light beam guided into said light guiding pipe in order to modulate said light emitting module based on said measured illuminance in such a manner that said light emitting module is capable of actively automatically controlling and maintaining said preset illumination area with said fixed illuminance;
wherein said converter circuit interface converts said illuminance intensity measured by said light sensor component into a change signal based on change relative to said fixed illuminance and transmits said change signal to said driving unit for said modulator to modulate said driving unit according to said change signal.

2. The light fixture according to claim 1, wherein said light sensor unit and said light emitting element are disposed in a same horizontal plane.

3. The light fixture according to claim 1, wherein said light sensor unit is disposed frontwardly of said light emitting element.

4. The light fixture according to claim 1, wherein said light emitting element comprises an LED.

5. The light fixture according to claim 1, wherein said light guiding pipe is generally V or U-shaped or a straight pipe having said first end defining an opening and said second end provided with said light sensor component such that in case said light guiding pipe is in V-shaped or U-shaped, an intermediation section of said V-shaped or U-shaped guiding pipe is installed with a reflector for reflecting a light beam entering through said opening.

6. The light fixture according to claim 5, wherein a focusing lens is provided at said opening of said light guiding pipe for focusing illumination onto said intermediation section.

7. The light fixture according to claim 5, wherein said reflector is a mirror.

8. The light fixture according to claim 1, wherein said light sensor unit measures the reflection light beam reflected from said preset illumination area after focusing.

* * * * *